UNITED STATES PATENT OFFICE.

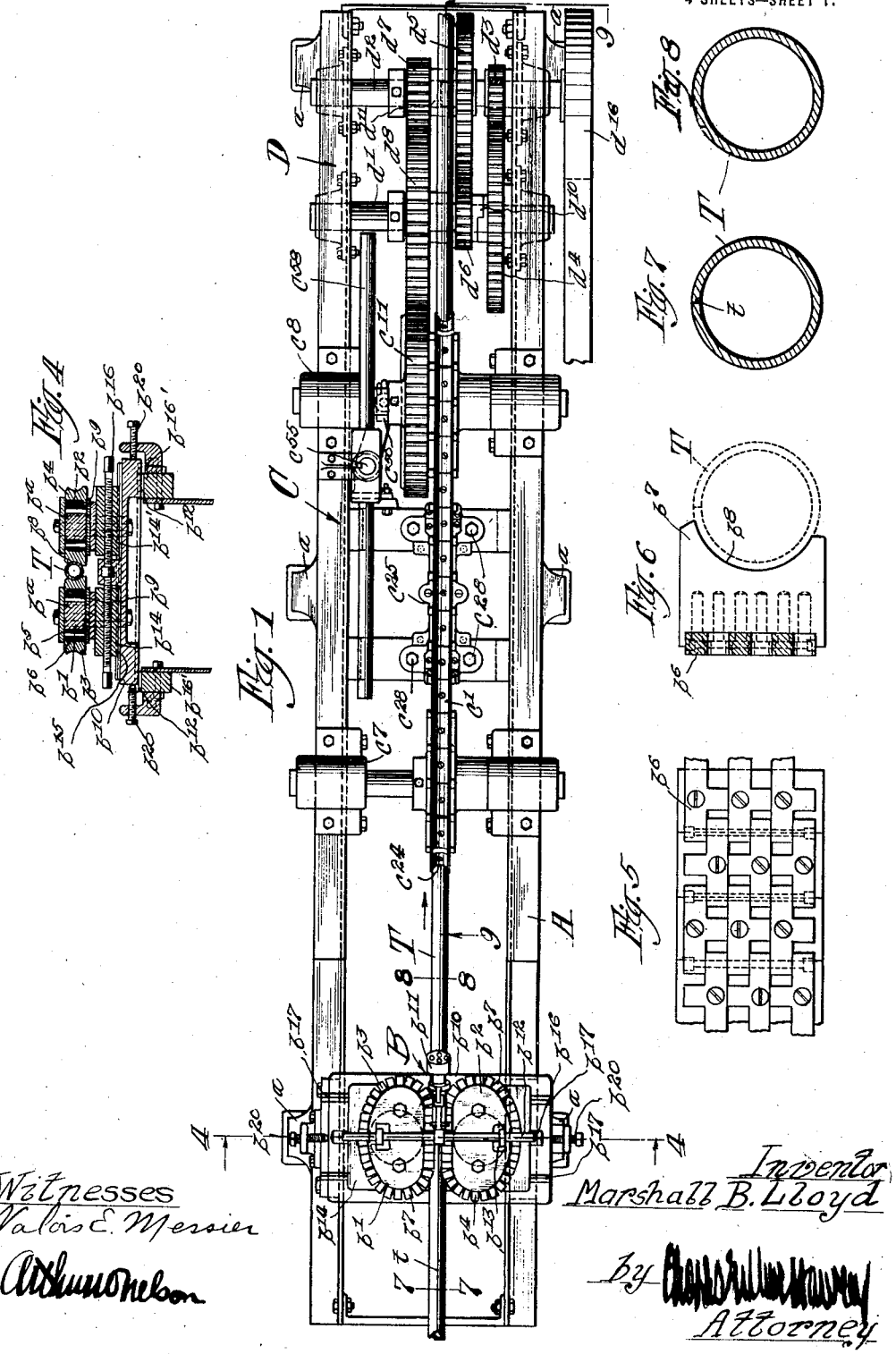

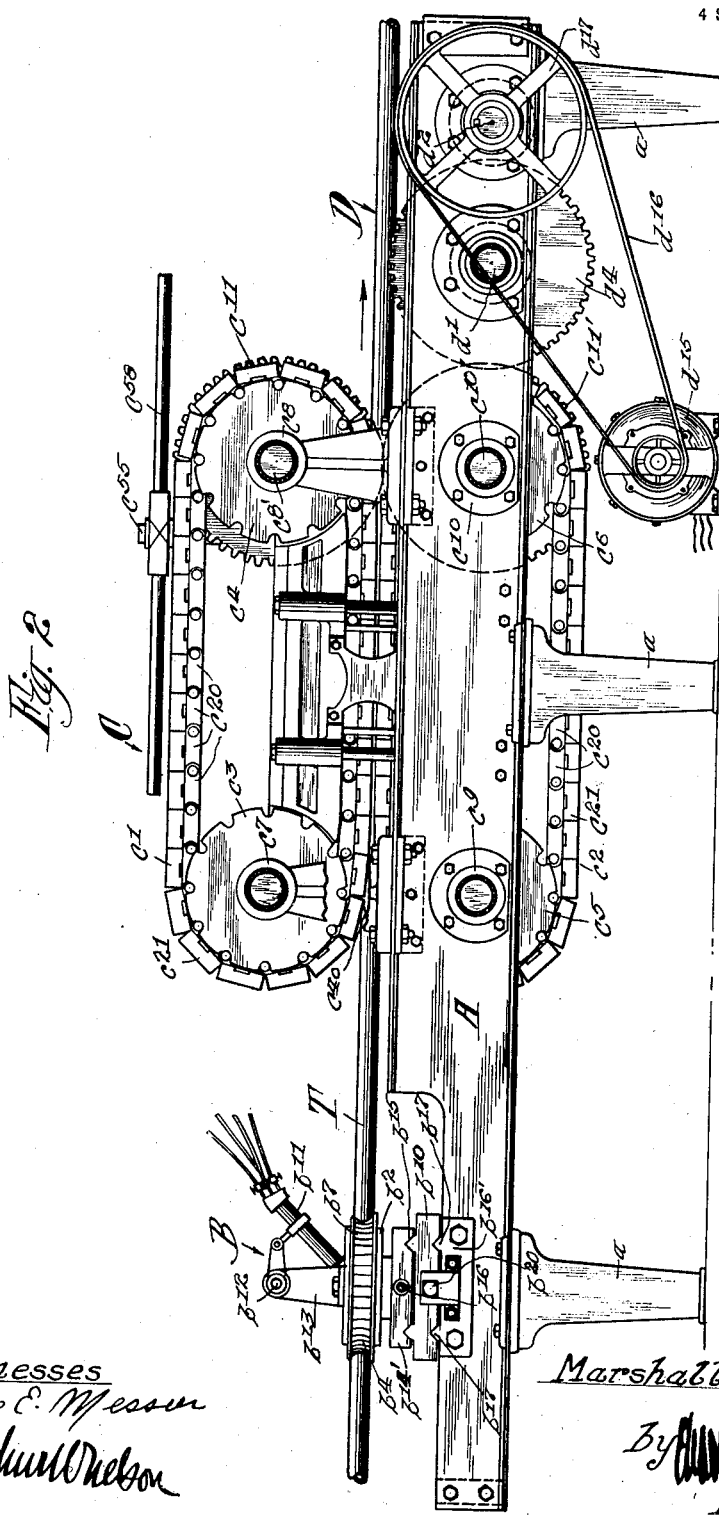

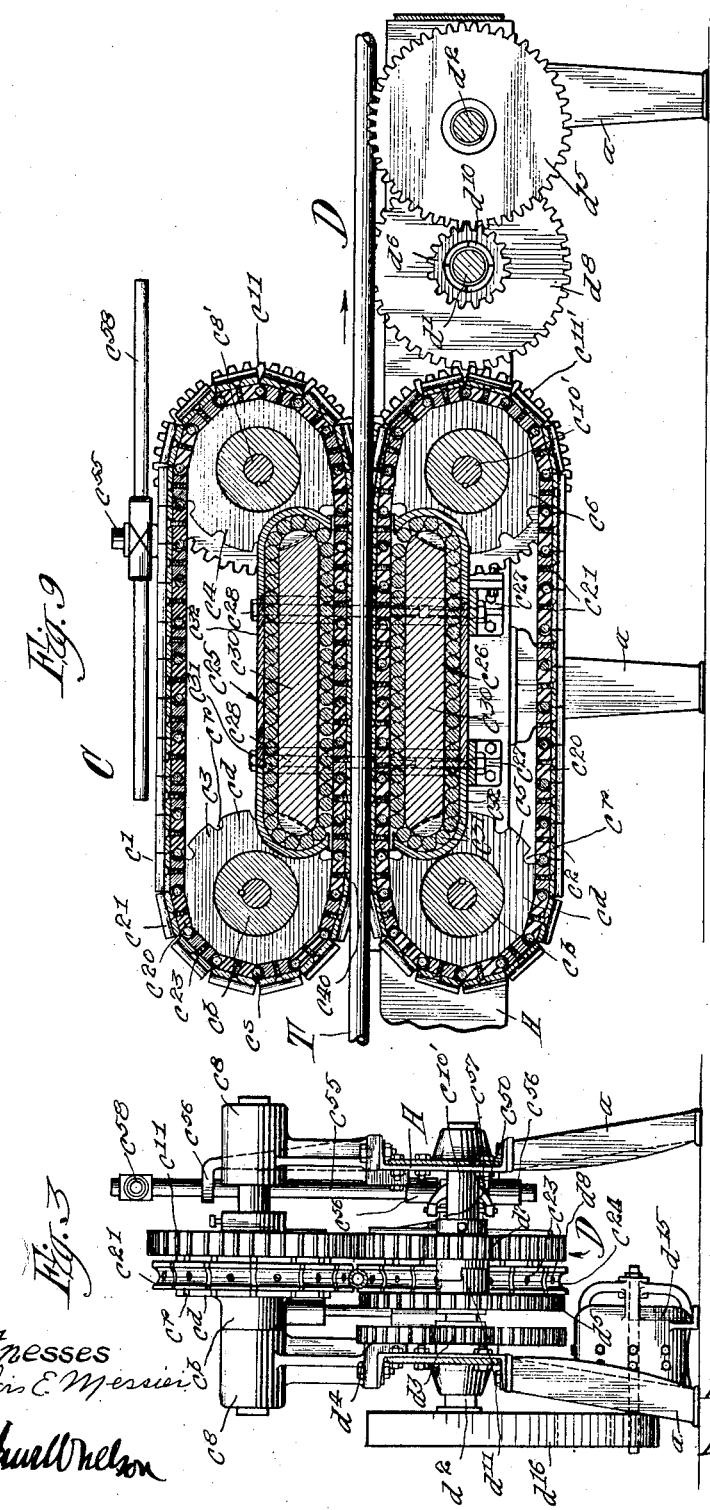

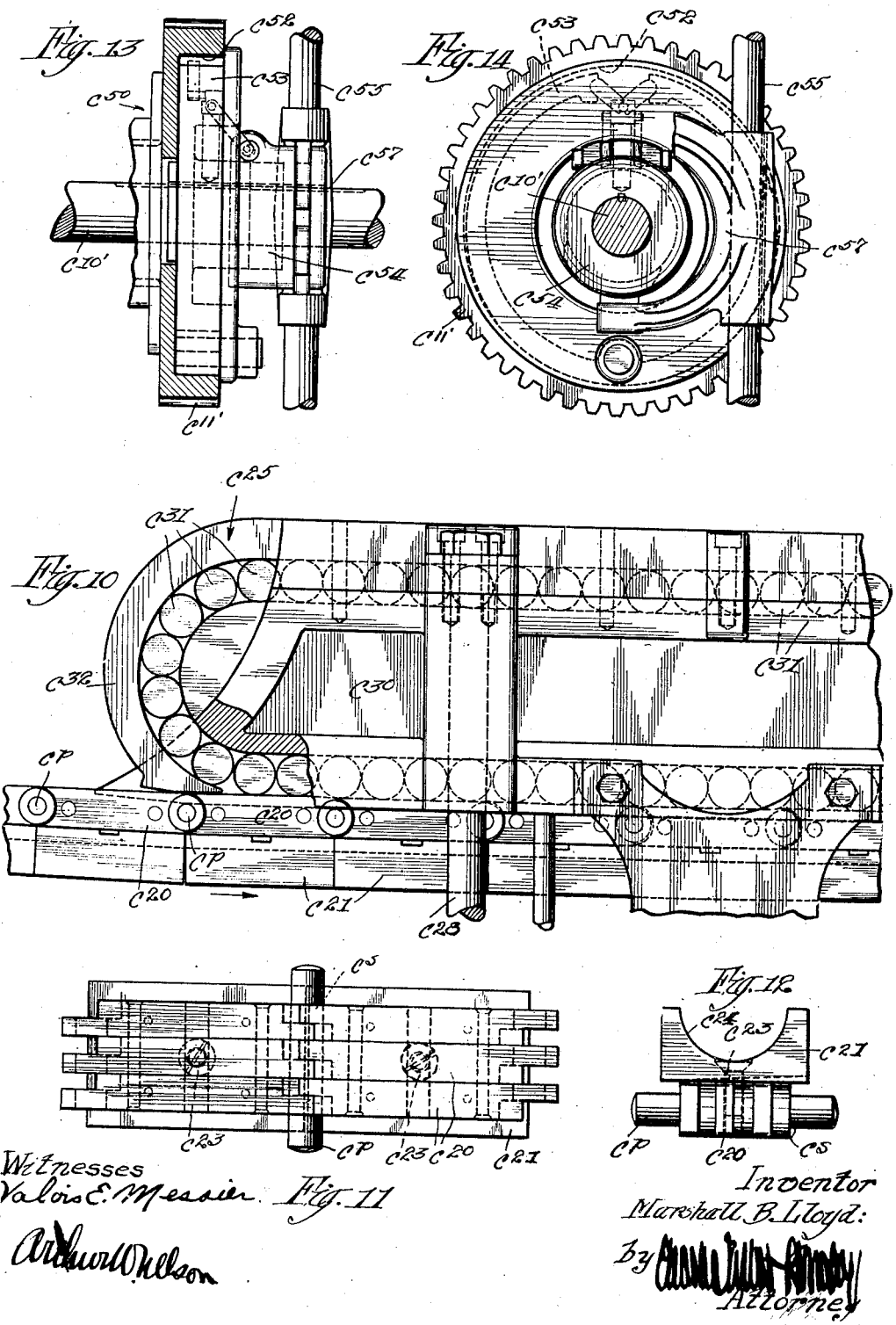

MARSHALL BURNS LLOYD, OF MENOMINEE, MICHIGAN, ASSIGNOR, BY MESNE ASSIGN-
MENTS, OF ONE-HALF TO THE ELYRIA IRON & STEEL COMPANY, OF ELYRIA, OHIO,
A CORPORATION OF OHIO, AND ONE-HALF TO THE STANDARD PARTS COMPANY, A
CORPORATION OF OHIO.

CONTINUOUS PROPELLING-VISE FOR TUBE-MAKING MACHINES.

1,321,463.     Specification of Letters Patent.     Patented Nov. 11, 1919.

Application filed October 31, 1913. Serial No. 798,559.

*To all whom it may concern:*

Be it known that I, MARSHALL B. LLOYD, a citizen of the United States, and a resident of Menominee, county of Menominee, and the State of Michigan, have invented certain new and useful Improvements in Continuous Propelling - Vises for Tube - Making Machines, of which the following is a specification.

My invention relates generally to mechanism for welding elongated articles of various kinds and relates more particularly to mechanism for continuously welding tubing.

The general object of my invention is to provide mechanism wherewith elongated articles such as tubing and the like can be welded more rapidly, more economically, and better than is possible with mechanism hitherto devised.

A further object of my invention is to provide simple and durable mechanism wherewith welded tubing of uniform strength and superficial smoothness can be continuously manufactured.

My invention consists generally in an elongated endless vise formed to hold the work to be operated upon, and other means for moving the work through the vise at a speed determined by the character of the operation to be performed thereon.

My invention consists further in mechaanism comprising an elongated endless vise formed to hold work in condition to be operated upon and opposing the movement of the work, and means for drawing the work through the vise, against the opposition thereof, at a substantially constant rate of speed.

My invention consists further in a welding machine comprising an elongated tube-holding vise, consisting of two opposed elements, an endless chain arranged for movement around each of the two opposed elements, portions thereof successively moving into opposed relation and forming an elongated working stretch, said elements as a whole arranged for movement to and from each other, and a welding torch arranged adjacent to the two opposed elements.

My invention consists also in an elongated pulling vise comprising two coöperating endless chains, a plurality of vise jaws affixed to the chains against rotation thereon, and pressure elements bearing upon the chains in one stretch and acting successively to clamp the jaws upon the article to be moved.

My invention consists further in the unique arrangement, construction, and coöperation of parts whereby the objects named above, and others which will appear hereinafter, are attainable, all of which will be more readily understood by reference to the accompanying drawings wherein:

Figure 1 is a plan view of mechanism embodying my invention;

Fig. 2 is a side elevation of the mechanism shown in Fig. 1;

Fig. 3 is an end view thereof;

Fig. 4 is a cross sectional view substantially on the line 4—4 of Fig. 1;

Figs. 5 and 6 are respectively detail bottom plan and end views of the chain and vise block shown in Fig. 4 for gripping the work;

Fig. 7 is an enlarged view of tube on line 7—7 of Fig. 1;

Fig. 8 is an enlarged view of tube on line 8—8 of Fig. 1;

Fig. 9 is a central longitudinal section substantially on the line 9—9 of Fig. 1;

Fig. 10 is an enlarged view showing the mechanism for applying pressure to the vise jaws;

Fig. 11 is a bottom plan view showing several of the vise jaws and the chain links which carry them;

Fig. 12 is an end view of the vise jaw and chain link shown in Fig. 11; and

Figs. 13 and 14 are respectively a sectional elevation and a side elevation of the clutch for coupling the endless pulling vise to the power shaft for actuating it.

In the formation of welded tubing a great number of problems are presented, which make difficult the rapid production of tubing which is uniform in strength, finish, size, and gage. A further problem is added when an attempt is made to produce welded tubing continuously and at a rapid rate of speed. I shall limit my discussion here to the manufacture of tubing from strip metal, but this, it should be understood, is done for simplicity in description. In order that the manufacture of such tubing may be better understood, I shall briefly describe the manner of making it. The strip metal usually comes from the mills in large bundles. The bundle is placed upon a reel from which it is passed through several dies or rolls which shape the strip metal into the form of a tube. The resulting tube has a longitudinal seam and to weld this seam a portion of the tube must be raised to welding temperature and then subjected to considerable pressure to unite the edges permanently. In practice the tube is often passed through various other mechanisms which act upon the tube. The result of this is that a powerful pull is required to move the tube through these mechanisms and particularly through the tube forming and welding mechanisms. The tube forming and welding mechanisms are in effect elements powerfully resisting the movement of the tube. The result of this resistance is that it is difficult when welding tubing of certain kinds, for instance, thin-walled tubing, to prevent the pulling mechanism from crushing or marring the tube. Since much of the welded tubing is used for purposes where a finished and polished tube is required, any indentation or marring of the surface makes it practically unsalable.

Another difficulty encountered, especially in welding tubing continuously by simply passing under a heating element, is to prevent opening of the welded seam.

It is my purpose to provide mechanism wherewith the difficulties enumerated can be successfully overcome, to the end that uniformly strong and perfect welded tubing can be produced rapidly and economically. I shall now describe my unique mechanism wherewith the desired results are attainable.

Referring to the drawings, A represents a strong bench or table elevated to convenient height by legs $a$, which serves to support the different mechanisms for acting upon the tube. The bench also usually contains other mechanisms for acting upon the strip metal, such, for instance, as the forming rolls or dies. At one end of the table I mount a unique welding device B and following this is a pulling device C arranged to receive its motion from speed-reducing mechanism D. The tube T which has been formed by the forming rolls or dies (not shown) contains a longitudinal seam $t$ as it approaches the mechanism B (see Figs. 1 and 7) which is to be closed by welding. For convenience in description, let us assume for the present that the pulling mechanism C is capable of pulling the tube through the forming mechanism (not shown) and the welding mechanism at any desirable speed and that it does so act. The welding mechanism B comprises two opposed elements $b^1$, $b^2$, around which endless chains or vises $b^3$, $b^4$, are arranged to move. The elements $b^1$, $b^2$ are essentially of the same construction so that a detailed description of one will serve for both. They comprise a body portion $b^a$ containing an annular or continuous groove $b^5$. In this groove $b^5$ an endless chain $b^6$ is arranged for movement. The chain $b^6$ has fixed thereto a plurality of vise jaws or blocks $b^7$, the shape of which is determined largely by the shape of the tube or article to be welded. Since I have shown a circular tube in the welding mechanism, I provide the block $b^7$ with a semi-circular recess $b^8$. In order to lessen the friction caused by the moving chain I interpose between the chain and the body portion $b^a$ anti-friction rolls $b^9$. The elements $b^1$ and $b^2$ are mounted upon a table $b^{10}$ for movement as will be described in detail hereinafter, to and from each other. By this means any desired pressure may be put upon the tube as it passes therethrough or, in other words, the mechanism B as related to the pulling mechanism C is adapted to present a resistance of variable magnitude. At the mechanism B I arrange means for bringing the portion of the tube adjacent the seam to welding heat as the tube passes therethrough. The tube heating may be accomplished by various means. One very satisfactory means I find to be an oxy-acetylene torch. Hence I have mounted a torch $b^{11}$ over the tube by means of a cross shaft $b^{12}$ supported on suitable brackets $b^{13}$. The torch projects a flame upon the tube, raising the portions adjacent the seam to welding heat, whence they are joined by the pressure of the opposed elements $b^1$ and $b^2$.

It is to be noted that I firmly hold the tube for a considerable length at the welding zone. This I find to be of great utility because after the tube is heated and joined by the means of pressure, it is held for a period sufficient to permit the edges to become firmly set so that when the tube emerges it has no tendency to open at the seam. As a result of this I find that I can pass the tube under the welding flame at a greater speed than is possible where the tube is compressed at only a line during the welding operation and with the same torch and the same consumption of gas. Hence the cost of welding tubing is materially decreased with my novel elongated welding vise. Also because the endless chain and vise blocks move directly with the movable elements $b^1$ and $b^2$ there is no lost motion between the parts and the tube can be firmly gripped without danger of marring. The chains and connected vise blocks, it will be understood, move continuously and grip successive new portions of the tube. Because of this characteristic I term the vise a cyclic vise.

The elements $b^1$ and $b^2$ are mounted respectively upon movable bases $b^{14}$ and $b^{14'}$ which contain V-grooves $b^{15}$ for coöperation with the V's of the table member $b^{10}$. For moving the bases $b^{14}$, $b^{14'}$ to and from each other I arrange a right and left hand threaded screw $b^{16}$ through both of the bases, so that by simply turning a screw any desired pressure can be put upon the tube.

Since the tube is pulled through the mechanism B by means of the pulling device C it is desirable and necessary that the working stretch of mechanism B, be perfectly alined with the working stretch of the pulling device C, to prevent bending or distortion of the tube. For this purpose I also provide means for moving both the elements $b^1$ and $b^2$ together without disturbing their relative position. This is accomplished by mounting the base upon another base $b^{16'}$ which contains V's $b^{17}$ upon which the table $b^{10}$ may be shifted as a whole. The table $b^{10}$ can be shifted by simple adjusting screws $b^{20}$ arranged at each side for that purpose and perfect alinement of the mechanisms B and C is easily secured.

Having thus described the welding mechanism, I shall now describe in detail my novel vise wherewith it is possible to pull the tube through the welding mechanism at any desired rate of speed and without in any way indenting or marring its surface. In practice it will be understood that this vise also serves to pull the metal through the forming mechanism and that it often serves to push the tube through other mechanism, such for instance as polishing and cut-off mechanisms. This mechanism comprises two endless conveyers $c^1$, $c^2$ operable over sprocket wheels $c^3$, $c^4$, $c^5$, $c^6$. For the sake of compactness I prefer to arrange the sprocket wheels in a vertical plane and for this purpose I provide horizontally disposed journals $c^7$, $c^8$, $c^9$ and $c^{10}$, which are supported in and from the main frame A. The shafts $c^{8'}$ and $c^{10'}$ have respectively gears $c^{11'}$ and $c^{11'}$ keyed thereto, the gear $c^{11'}$ meshing with gearing of the speed-reducing mechanism D, which will be described in detail hereinafter, and wherewith the conveyers $c^1$ and $c^2$ are given continuous movement. Each of the sprocket wheels comprises a central hub portion $c^b$ and two spaced disk-like portions $c^d$. The disk-portions each contain a number of sprocket recesses $c^r$ and the conveyer chain is provided with studs $c^s$ the end portions $c^p$ (see Figs. 11 and 12) of which engage said recesses. It is obvious that rotation of the sprockets causes continuous movement of the conveyers. Because of the cycle-like movement of the conveyers $c^1$ and $c^2$, I term them a cyclic vise. The upper and lower conveyers are essentially the same, so that a description of one will serve for both.

The conveyer comprises a chain portion composed of a plurality of chain links $c^{20}$, to each link of which I attach a vise jaw $c^{21}$. The same conveyer chain may be used for forwarding different types of work by simply providing the proper shaped vise jaws. For this reason I prefer removably to secure the vise jaws to the chain, a simple stud screw $c^{23}$ serving for that purpose. The vise jaws $c^{21}$ in this instance are each formed with a semi-circular or substantially semi-circular recess or groove $c^{24}$ so that two of the opposite jaws serve substantially to inclose or encircle the tube. In order to secure a powerful pulling effect it is necessary to provide means for pressing the upper and lower conveyers upon the tube, and this I do by simple and unique mechanism. Between the journals $c^7$ and $c^8$ I arrange a pressure member $c^{25}$. This is a floating device and rests upon the upper conveyer $c^1$. Arranged under this device, and contiguous to the upper stretch of the lower conveyer, is a similar device $c^{26}$. The device $c^{26}$, in this instance, is not a floating device, but, on the contrary, is firmly attached to the frame of the machine by means of bolted castings $c^{27}$, best shown in Fig. 9.

In order to move the upper device $c^{25}$ toward the lower, I provide two long bolts $c^{28}$ on each side thereof, which extend into threaded bosses in the lower fixed device $c^{26}$. By screwing the bolts the upper member $c^{25}$ can be brought into forceful contact with the lower or working stretch of the upper conveyer chain $c^1$. Since this movement is opposed by the fixed lower device, it is obvious that the tube will be firmly clamped and that any desired pressure up to the crushing strength of the tube may be created. The tube, however, will stand tremendous pressure without being marred or crushed because the jaws are formed to inclose substantially all of the tube. The pressure or power necessary to pull certain of the tubes through the welding and other mechanisms is often very great, and for this reason it is desirable and necessary to provide means for reducing the friction between the pressure blocks and the moving conveyers. I have devised mechanism for this purpose which will be best understood by reference to Figs. 9 and 10. The device $c^{25}$ consists of an elongated solid portion $c^{30}$ the length of which approximates the working stretch of the vise. This block serves as a runway for a plurality of anti-friction rolls $c^{31}$ which are kept in place by a casing $c^{32}$ fixed to the block $c^{30}$ and by engagement with the conveyer chain. It will be noted that the conveyer chain gradually approaches the tube as indicated at $c^{40}$ and that before any pressure is put upon the blocks by the devices $c^{25}$ and $c^{26}$ the blocks are perfectly alined with the tube. This is a very important feature since, by such a construction, any tendency to dent or mar the tube is positively prevented. The conveyer chains as they pass through the upper and lower pressure blocks $c^{25}$ and $c^{26}$ are also limited to rectilinear movement and as the vise blocks are affixed thereto against rotation there is no possibility of the vise jaws indenting the tube in the working stretch of the vise. I prefer so to proportion the blocks and rollers that each of the blocks will always be engaged by two or more of the rolls. After the working stretch, the conveyer chains gradually recede from the tube, and therefore have no tendency to mar it when being released therefrom. The spaced construction of the sprocket wheels permits me greatly to decrease the length of the vise since the pressure blocks can extend therebetween into close proximity to the sprocket hub.

In the manufacture of tubing, it is often necessary to stop the movement of the tubing for an instant to inspect it or to fix the welding flame or some part of the welding mechanism. This is usually for such a small period that it is not expedient to stop the entire pulling mechanism. For this reason I prefer to provide a separate clutch for connecting and disconnecting the conveyer chains with the driving mechanism, and for this purpose I provide on the shaft $c^{10'}$ a clutch $c^{50}$. This will be best understood by reference to Figs. 13 and 14. Fixed to the shaft $c^{10'}$ is a gear $c^{11'}$ which engages with one gear of the gearing D, and whereby it is given its motion. The gear $c^{11'}$ contains an inner friction surface $c^{52}$ and for engagement therewith I provide an expanding friction band $c^{53}$. The band $c^{53}$ can be expanded by simply shifting the block $c^{54}$ on the shaft $c^{10'}$, as will be obvious by reference to Figs. 13 and 14 referred to. For shifting the block $c^{54}$ I provide a stand-post $c^{55}$ vertically supported in suitable bearings $c^{56}$, and at the lower end of which is a fork $c^{57}$ which engages the block $c^{54}$. Hence by rotating the stand-post $c^{56}$ the clutch can be thrown in to start the machine. As considerable frictional contact is necessary, I prefer to provide a long leverage for turning the stand-post, and for this reason mount a horizontal pipe $c^{58}$ at the upper end of the stand-post. This forms a convenient means for operating the clutch and one which is easily accessible from any part of the machine and particularly from a position near the welding portion since much of the attention of the operator is directed to that mechanism.

For most welding purposes but a slow movement of the tube is required, and for this reason a small motor, properly geared, is sufficient to exert the pull required. The driving mechanism D is mounted upon cross shafts $d^1$, $d^2$ and comprises a number of gears $d^3$, $d^4$, $d^5$, $d^6$, $d^7$, and $d^8$. The member $d^3$ is keyed to the shaft $d^2$, and meshes with the gear $d^4$ which is loose upon the shaft $d^1$, and which imparts motion to the gear $d^6$, by means of clutch $d^{10}$. The gear $d^6$ in turn meshes with the gear $d^5$ which imparts motion to the gear $d^7$ by means of the clutch $d^{11}$, and from the gear $d^7$ through the gear $d^8$ the gear member on the shaft $c^{10'}$ is rotated. The shaft $d^2$ is actuated by the motor $d^{15}$ through the medium of the belt and pulley $d^{16}$ and $d^{17}$.

The mechanism here shown and described is adapted successfully to accomplish the objects stated in the opening of the specification, and it is believed that the many advantages thereof will be apparent to those skilled in the art to which it appertains. Since various modifications will readily suggest themselves to others by this disclosure, I do not wish to limit myself to the specific construction and use herein shown and described, except as may be necessary by express limitations in the claims hereunto appended.

The welding mechanism herein shown is not claimed in this application but is described and claimed in a divisional application, Serial Number 150,553, filed Feb. 23, 1917, entitled Welding device.

I claim:—

1. In a device of the class described, the combination of a pulling vise comprising two endless chains, a plurality of vise jaws rigidly attached to the links of respective chains, means for successively moving portions of the chains together successively to clamp the vise jaws upon the article to be moved, and means limiting the chains to rectilinear movement in the working stretch.

2. In a pulling vise, the combination of two coöperating endless chains, a plurality of vise jaws rigidly fixed to respective links of said chains, and pressure elements bearing upon the chains in one stretch successively to clamp the jaws upon the article to be moved.

3. In a continuous vise, the combination of two endless chains and sprocket wheels upon which they are secured in opposed relation, with a plurality of vise jaws fixed on the links of each chain, pressure elements arranged to force successive pairs of opposed jaws toward each other to clamp the article to be drawn and limiting the jaws thereafter to rectilinear movement for a predetermined length, and anti-friction means interposed between the pressure elements and the chains.

4. In a continuous vise, the combination of two endless cyclic chains, a plurality of vise jaws affixed to the links in end to end abutment when moving in a straight line, and rigidly held on the chains, pressure elements arranged to force successive pairs of jaws toward each other to clamp the article to be drawn and limiting the jaws thereafter to rectilinear movement for a predetermined length, and anti-friction means interposed between the pressure elements and the chains.

5. In a continuous cyclic vise, the combination of two endless chains, a plurality of vise blocks rigidly fixed on each of the chains, two pressure elements for successively forcing portions of the chains containing opposed pairs of vise jaws together to clamp the tube, one of said pressure elements being fixed against movement, and the other thereof being movable to and from the fixed element.

6. In a continuous cyclic vise, the combination of two endless chains, a plurality of vise blocks rigidly affixed to each of the chains, two pressure elements for successively forcing portions of the chains containing opposed pairs of vise jaws together to clamp the tube, a plurality of anti-friction means interposed between the chains and the pressure elements, and one of said pressure elements being fixed against movement and the other thereof being movable to and from the fixed element.

7. In a cyclic work forwarding vise, the combination of two endless chains mounted with elongated portions thereof in contiguous opposed relation, a vise jaw on each link of each chain and rigid therewith, and anti-friction rollers arranged to bear upon the blocks of the chain links in aforesaid continguous portions of the chains.

8. In a cyclic work forwarding vise, the combination of two endless chains each composed of pivotally connected block links, with a vise jaw on each link and anti-friction rollers arranged to bear upon the aforesaid contiguous portions of the chains, the arrangement being such that a number of rolls bear on each link and serve to limit the chain links and attached vise jaws to rectilinear movement.

9. In a work pulling vise, the combination of two cyclic endless chains, a plurality of vise jaws rigidly affixed to the chain and thus held against rotative movement thereon, means for causing the gradual approach of opposed pairs of vise jaws and adjusting same to parallel position and means then acting firmly to clamp the opposed jaws together.

10. In a work pulling vise, the combination of two cyclic endless chains, a plurality of vise jaws rigidly affixed to each chain and thus held against rotative movement thereon, means for gradually causing the approach of opposed pairs of vise jaws and adjusting same to parallel position, and means then acting firmly to clamp the jaws upon the work, said means limiting the jaws to rectilinear movement through a predetermined length and permitting the retraction of the jaws to release the article.

11. In a device for pulling tubes, rods, and the like, the combination of two elongated cyclic chains, a plurality of vise jaws rigidly affixed to the links of each chain and thus held against rotative movement thereon, and mechanism formed successively to move the working stretches of the chains together and close the vise blocks upon the article to be drawn and formed at each end to cause the gradual approach of the blocks to the work and the gradual retraction thereof from the work, as and for the purpose specified.

12. In a vise for pulling elongated articles, the combination of four sprocket wheels arranged in spaced pairs, each sprocket comprising two spaced link engaging portions, two endless chains engaging respective spaced pairs of sprocket wheels and spanning the space between the spaced portions thereof, and pressure elements arranged between respective pairs of sprocket portions and having their ends accommodated between the spaced apart portions of said wheels.

13. In a vise for pulling elongated articles, the combination of four sprocket wheels arranged in spaced pairs, each sprocket comprising two spaced link engaging portions, two endless chains engaging respective spaced pairs of sprocket wheels and spanning the space between the spaced portions thereof, pressure elements arranged between respective sprocket portions with their end portions embraced within said wheels and anti-friction devices interposed between respective pressure elements and their respective chains.

14. In a vise for pulling elongated articles, the combination of four sprocket wheels arranged in spaced pairs, each sprocket comprising two spaced link engaging portions, two endless chains engaging respective spaced pairs of sprocket wheels and spanning the space between the spaced portions thereof, and pressure elements arranged between the sprocket portions and having the end portions thereof extending into the spaces between the portions of respective sprockets, said pressure elements being relatively movable to and from each other to move portions of the chains and attached vise jaws toward and from each other.

15. In a vise for pulling elongated articles, four sprocket wheels arranged in spaced pairs, each sprocket comprising two spaced link engaging portions, in combination with two endless chains engaging respective spaced pairs of sprocket wheels and spanning the space between the spaced portions thereof, and pressure elements arranged between the spaced sprocket portions and having the end portions thereof extending into the spaces between the portions of their respective sprocket wheels, one of said pressure elements being fixed to the frame of the machine and the other movable toward the fixed element, and means for moving the movable element.

16. In a vise for pulling elongated articles, the combination of four sprocket wheels arranged in spaced pairs, each sprocket comprising two spaced link engaging portions, two endless chains engaging respective spaced pairs of sprocket wheels and spanning the space between the spaced portions thereof, pressure elements arranged between the spaced sprocket portions and having their end portions extending into the space between the two portions of each sprocket, and means for driving said sprockets and chains.

17. In a vise for pulling elongated articles, the combination of four sprocket wheels arranged in spaced pairs, each sprocket comprising two spaced link engaging portions, two endless chains engaging respective spaced pairs of sprocket wheels and spanning the space between the spaced portions thereof, pressure elements arranged between the spaced sprocket portions and having their ends extending into the space between the two portions of each sprocket, mechanism arranged to impart motion to the endless chains, and a clutch for connecting the movable chains to said mechanism.

18. In a vise for pulling elongated articles, the combination of four sprocket wheels arranged in spaced pairs, each sprocket comprising two spaced link engaging portions, two endless chains engaging respective spaced pairs of sprocket wheels and spanning the space between the spaced portions thereof, pressure elements arranged between the spaced sprocket portions and having their ends in the space between the two portions of each sprocket, mechanism arranged to impart motion to the endless chains, a clutch for connecting the movable chains to the driving mechanism, and a stand-post for operating said clutch.

19. In a machine of the class described, an endless vise composed of two endless chains, a plurality of vise jaws rigidly but detachably received to respective links of said chains acting to close the vise jaws at a given point in the chain travel and thereby grip an object.

20. In a machine of the class described, an elongated endless vise composed of two endless chains and vise block elements, a plurality of vise jaws rigidly secured directly to each chain, said chains traveling in a cycle and means for moving the chains and attached vise block elements successively together to grasp an object at a given point and to limit the chain and vise blocks to rectilinear motion when in engagement with the article.

21. An automatic single direction continuous vise composed of a conveyer and elongated endless series of longitudinally abutted vise jaws thereon, in combination with mechanism for driving said series, pressure guides co-acting with respective series of jaws in one stretch thereof to cause the jaws to close together upon entering said stretch, holding them in closed position while passing through said stretch, and limiting them to rectilinear motion therein.

22. An automatic single direction continuous vise composed of a conveyer and elongated endless series of longitudinally abutted vise jaws thereon, in combination with mechanism for driving said series, pressure guides co-acting with respective series of jaws in one stretch thereof to cause the jaws to close together upon entering said stretch, holding them in closed position while passing through said stretch, and limiting them to rectilinear motion therein, and anti-friction devices operatively interposed between said guides and chains.

23. An automatic single direction continuous vise composed of two elongated chains, each thereof carrying a plurality of vise jaws attached thereto and rigidly held against rotation thereon, in combination with means for driving the same, means for moving the jaws into parallel relation with the article to be drawn and means acting to close the vise jaws upon the article and anti-friction devices interposed between said means and the chain constituting said stretch.

24. In a continuous vise, two pairs of sprocket wheels mounted in the same plane, block chains traveling on respective pairs of sprocket wheels and having their opposed stretches in parallelism, vise jaws fastened to the links of the chains, parallel guides whereby the opposed stretches of the jaw equipped chains are held together, and anti-friction devices interposed between the backs of the chains and respective guides, said anti-friction devices traveling at a different rate of speed than the chains.

25. In a continuous vise, two pairs of bifurcated sprocket wheels in opposed relation, block link chains carried by respective pairs of sprocket wheels through the medium of the pivot pins of the links, a pressure bar for each chain, a roll race inclosing said bar and having its ends within respective bifurcated sprockets, and a series of rolls filling said race for coaction with the backs of respective block links.

26. In a continuous vise, two pairs of bifurcated sprocket wheels in opposed relation, block link chains carried by respective pairs of sprocket wheels through the medium of the pivot pins of the links, a pressure bar for each chain, a roll race inclosing said bar and having its ends within respective bifurcated sprockets, and a series of rolls filling said race for coaction with the backs of respective block links; the lines of coaction between the rolls and the backs of said links being projected beyond a tangent to the sprocket wheels.

In testimony whereof, I have hereunto set my hand, this 23rd day of October, 1913, in the presence of two subscribing witnesses.

MARSHALL BURNS LLOYD.

Witnesses:
HILDA C. PETERSON,
R. W. WELLS.